United States Patent [19]

Spencer

[11] 4,033,862
[45] July 5, 1977

[54] APPARATUS FOR HANDLING WOUND ROLLS

[75] Inventor: Harvey J. Spencer, Green Bay, Wis.

[73] Assignee: Paper Converting Machine Company, Green Bay, Wis.

[22] Filed: Jan. 21, 1976

[21] Appl. No.: 651,200

[52] U.S. Cl. .................................. 209/73; 198/370; 198/435; 198/653; 198/696
[51] Int. Cl.² ....................... B07C 9/00; B65G 47/52
[58] Field of Search .................... 209/73, 82, 88 R; 198/31 AA, 179, 370, 435, 440, 479, 653, 695, 696

[56] References Cited
UNITED STATES PATENTS

| 1,326,903 | 1/1920 | Augensen | 198/31 AA |
| 1,413,995 | 4/1922 | Salerno | 198/179 X |
| 3,747,737 | 7/1973 | Brooke | 198/31 AA |
| 3,757,926 | 9/1973 | Gendron et al. | 198/179 X |

Primary Examiner—Robert B. Reeves
Assistant Examiner—Joseph J. Rolla
Attorney, Agent, or Firm—Tilton, Fallon, Lungmus, Chestnut & Hill

[57] ABSTRACT

Apparatus for handling wound rolls wherein an upper takeaway conveyor receives rolls from a source conveyor and delivers the same selectively to a plurality of diverter conveyors. Each conveyor is equipped with a plurality of spaced apart grippers including three fingers grouped two on one side of each roll and one finger on the other.

10 Claims, 5 Drawing Figures

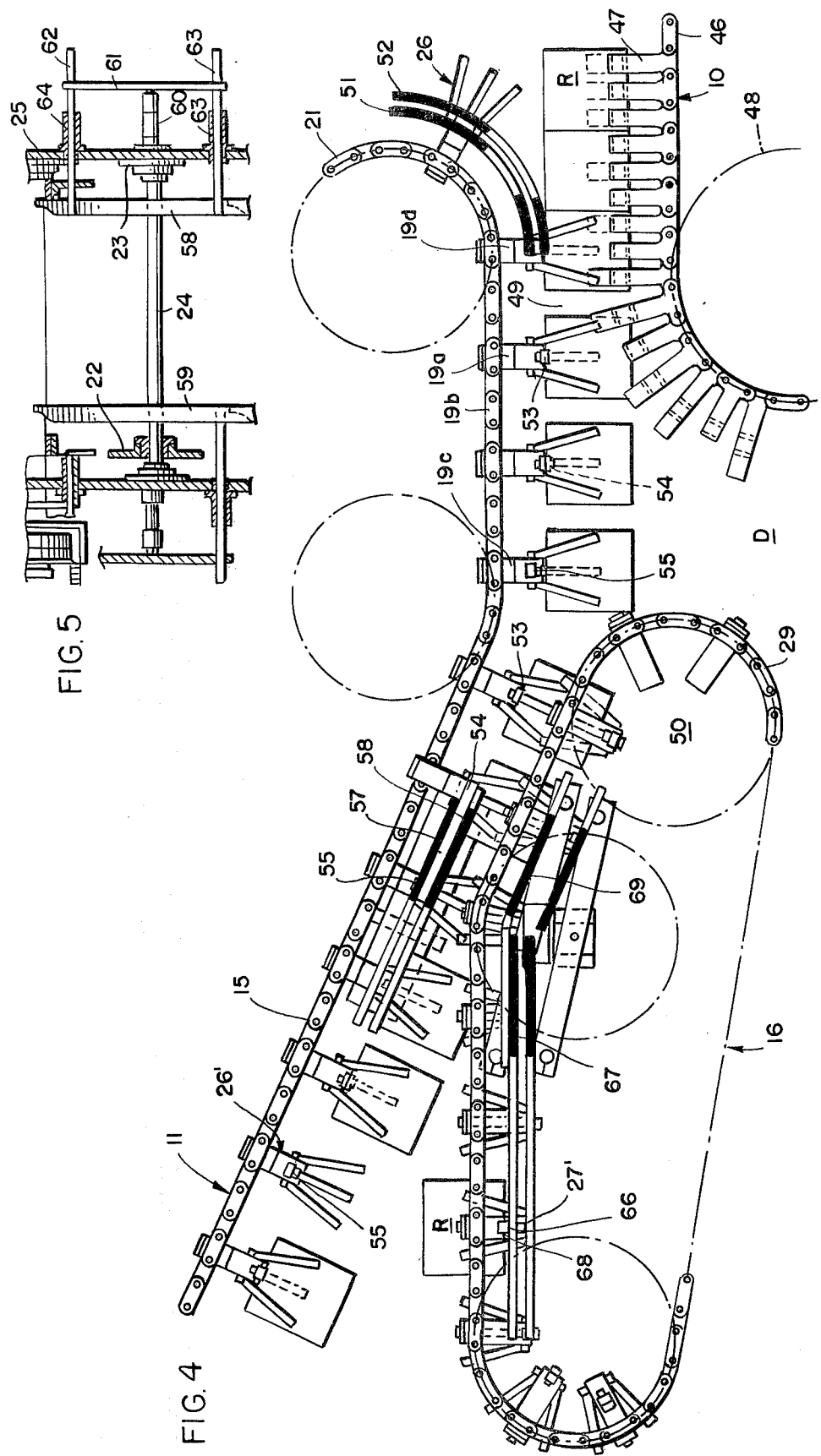

APPARATUS FOR HANDLING WOUND ROLLS

BACKGROUND AND SUMMARY OF INVENTION

This invention relates to apparatus for handling wound rolls and more particularly, to apparatus for dividing or diverting a series or stream of wound rolls into a plurality of separate streams. As such, the invention has utility in connection with the production of wound rolls such as toilet paper or towelling. These paper rolls are produced at high speed on machines commonly referred to as "rewinders". The rewinder receives a jumbo roll (often 4 to 6 feet in diameter and 5 to 10 feet in length) and unwinds the same incident to a series of rewindings to produce the conventional retail size rolls. Normally, the rewinding results in a log having the diameter of the ultimate roll but having a length the multiple of the retail roll length. The logs are normally processed through a log saw which cuts the logs transversely, and this also is achieved at high production rates. Resulting from this operation of rewinding and log sawing is a steady, high velocity stream of rolls requiring packaging. The current art in packaging machinery is incapable of maintaining the pace set by the rewinder-log saw so multiple packaging machines are needed for each rewinder-log saw installation. A reliable, simple and rugged means is required for distributing the rolls to the various packaging machines and the provision of such distribution apparatus constitutes an important object of this invention.

The advantageous distribution of wound rolls at high speed is achieved through the arrangement of a takeaway conveyor above the log saw output conveyor whereby the takeaway conveyor grips the individual rolls via depending fingers and then transports them along an upwardly inclined path for selective transfer to diverter conveyors each equipped with upstanding grippers.

DETAILED DESCRIPTION

The invention is described in conjunction with an illustrative embodiment in the accompanying drawing in which —

FIG. 4 is a fragmentary side elevational view of the portion of the apparatus wherein rolls are transferred from the source conveyor to the takeaway conveyor and then selectively to a first diverter conveyor; and FIG. 5 is a fragmentary sectional view taken along the line 5—5 of FIG. 4.

Figure 1:
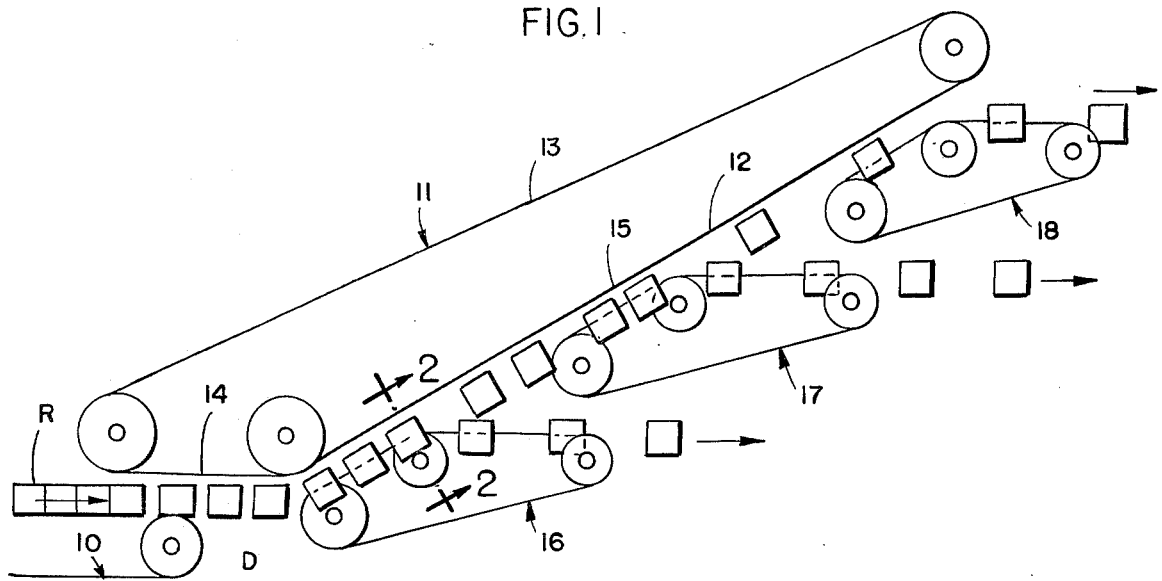
FIG. 1 is a side elevational view of a schematic representation of the inventive apparatus.

Reference is first made to FIG. 1 wherein the numeral 10 designates generally a source conveyor and the numeral 11 generally a takeaway conveyor. The takeaway conveyor 11 has a lower run 12 and an upper run 13 — with the lower run having a horizontally extending portion 14 (generally overlying the source conveyor 10) and an upwardly inclined portion 15. The first or horizontal portion 14 of the lower run 12 overlaps or extends beyond the source conveyor 10 to provide a space D for the dumping or depositing of improper rolls, i.e., those which cannot be suitably gripped by the takeaway conveyor 11.

Those rolls as at R which are properly sized, are taken up by the takeaway conveyor 11 and selectively delivered to one of a plurality of diverter conveyors generally designated 16, 17 and 18. Fewer or more diverter conveyors may be employed as required by the roll handling system.

Figure 2:
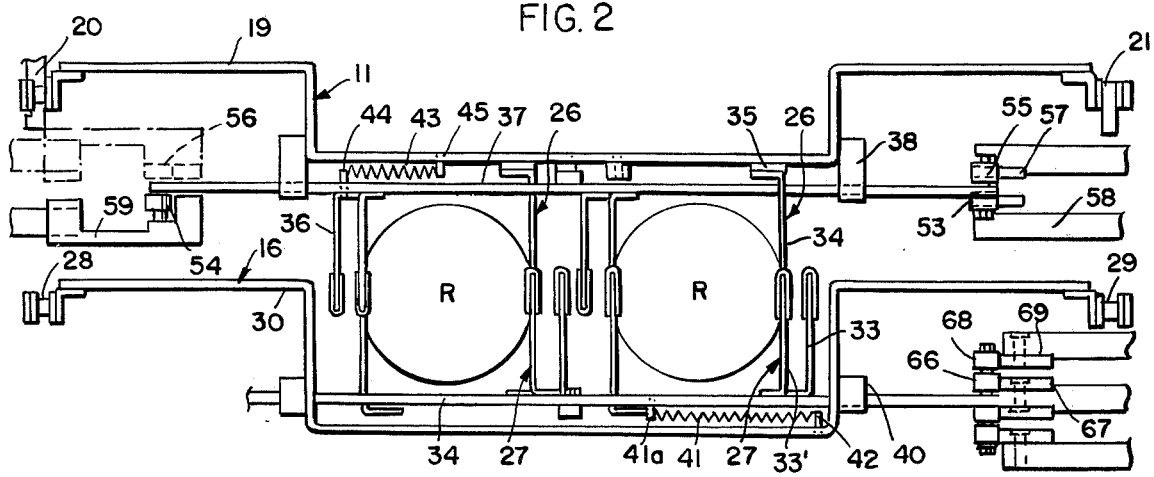
FIG. 2 is a fragmentary perspective view taken along the line 2—2 of FIG. 1.
Figure 3:
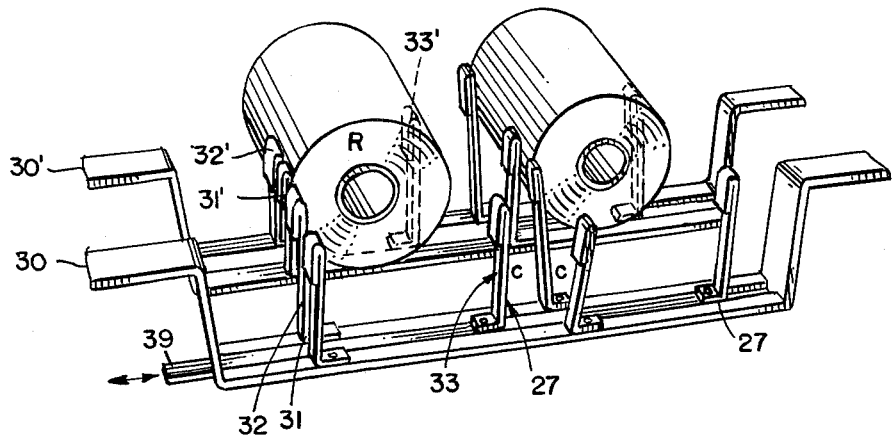
FIG. 3 is a fragmentary perspective view of a portion of one of the diverter conveyors.

The basic arrangement by which the diverter conveyors 16–18 grip the rolls R can be appreciated from FIG. 3 and the arrangement by which rolls are transferred from the takeaway conveyor 11 to the various diverter conveyors 16–18 can be appreciated from FIG. 2.

FIG. 2 shows the details of the gripping element of the takeaway conveyor 11 and the first diverter conveyor 16. The takeaway conveyor 11 (in the upper portion of FIG. 2) consists of a plurality of spaced apart carriers 19 which are supported between endless chains 20 and 21. The chains 20 and 21 are suitably entrained on sprockets as seen at 22 and 23 (see FIG. 5) fixed to a plurality of cross shafts 24 mounted on the machine frame 25.

In the illustration given, the roll handling apparatus is arranged to handle two rolls R in side-by-side relation (see FIG. 2). Each roll R is gripped by depending grippers generally designated 26. After transfer, the rolls R are gripped by upstanding grippers generally designated 27 provided, for example, on the diverter conveyor 16.

The diverter conveyor 16 likewise includes endless chains 28 and 29 (see FIG. 2) suitably entrained on sprockets associated with the frame 25. The diverter conveyor 16 includes a plurality of longitudinally spaced apart carriers 30 supported between the chains 28 and 29. Two such carriers 30 and 30' are seen in FIG. 3 and are seen to be equipped with the upstanding grippers generally designated 27. Each gripper 27 includes three fingers as at 31, 32 and 33 (still referring to FIG. 3). The fingers are grouped two on one side of a roll — as at 31 and 32 and one on the other side, as at 33. In the illustration given, the single finger 33 is movable relative to the fingers 31 and 32 to apply the gripping action. For example, the finger 33' (in the background of FIG. 3) is in the gripping position relative to the fingers 31' and 32' about the roll R. This is achieved by mounting the finger 33, for example, on a slide member 34 — designated in the lower left portion of FIG. 3.

The fingers in the depending grippers 26 associated with the takeaway conveyor 11 are reversely oriented — relative to the upstanding fingers 31–33 of the diverter conveyor 16. By this it is meant that the grouping two on one side and one on the other is reversed in going from one conveyor to the other. Thus, the numeral 34 in FIG. 2 (see the upper right portion) designates a pair of spaced apart fingers which straddle the single upstanding finger 33 or 33', as the case may be. Still referring to FIG. 2, it will be noted that the double fingers 34 are rigidly secured to the carrier 19 as at 35. Conversely, the single fingers 36 associated with the upper takeaway conveyor 11 are movably related relative to the carrier 19 by virtue of being mounted on a slide member 37. The slide member 37 is slidably carried in blocks 38 (see the right hand side of FIG. 2), the blocks 38 being rigidly fixed to the carrier 19.

In similar fashion, the slide member 39 associated with each carrier 30 is slidably supported in blocks 40 fixed to the carrier 30 (see the lower right hand portion of FIG. 2). In the illustration given, the single fingers 33 associated with the lower carriers 30 are biased to the "open" position by means of a spring 41 interconnected between the slide member 39 (as at 41a) and the carrier as at 42 — see the lower central portion of FIG. 2. Conversely, the upper carrier single fingers 36 are biased to the "closed" position by means of the spring arrangement 43 connected between the slide member 37 as at 44 and the carrier 19 as at 45.

As will be described in greater detail hereinafter, the slide members 37 and 39 are equipped at their ends with cam followers which are engageable with cam surfaces for controlling the positions of the slidably mounted fingers 33 and 36. Thus, in the area of roll transfer from the takeaway conveyor 11 to the first diverter conveyor 16 — in the area designated by the section line 2—2 in FIG. 1 — the upper carrier fingers grip the rolls R simultaneouly with the lower fingers until the paths of the conveyors 11 and 16 diverge. If the roll is to be diverted to the diverter conveyor 16, the upper movable fingers 36 are cammed "open" — against the urging of the spring 43 to permit the lower grippers 27 to take over and conduct the roll R along the lowermost horizontal path of diversion. It will be appreciated that in view of the reverse arrangement of the upper and lower fingers, a given upper movable finger 36 will normally be positioned between the lower upstanding stationary fingers 31' and 32' whereas the upper double stationary fingers 34 will normally bracket the lower movable finger 33.

Referring now to the FIG. 4, and particularly the right hand portion thereof, the takeaway conveyor generally designated 11 is seen to be in the horizontal run 14 thereof. It is at this juncture where the takeaway conveyor 11 cooperates with the source conveyor 10 to transfer rolls R. The source conveyor 10 is seen to be equipped with an upper run 46 which is equipped with spaced supports 47 for supporting the stream of rolls R. The upper runs of the chain 46 are advantageously entrained about sprockets 48 and, in the illustration given, are driven at a linear speed somewhat less than the linear speed of the chains 20 and 21 associated with the takeaway conveyor 11. This results in a spacing between gripped rolls as at 49 which avoids any interference between adjacent rolls when the rolls are being selectively diverted to the various conveyors 16–18.

As mentioned with respect to FIG. 1, a space or area D is provided for the discharge of improperly sized or shaped rolls, i.e., rolls which are not automatically gripped by the depending grippers 26 on the takeaway conveyor 11. For example, a roll which is not substantially perfectly round or one which is too short will not be properly gripped and thus fall between the source conveyor 10 and the first diverter conveyor 16 — to be reprocessed or otherwise disposed of.

As the lower run of the takeaway conveyor 11 enters its second stage or portion 15, i.e., the upwardly inclined portion, the grippers 26 cooperate with the grippers 27 for transferring selected rolls to the first diverter conveyor 16. For example, the gripper 26' (second from the left in FIG. 4) is seen to be without a roll, thus having been transferred to the diverter gripper 27'. The output of the various diverter converters 16–18 may be any conventional infeed to packaging machinery — the important feature being that a high volume source can be accommodated without overloading an individual wrapping machine (not shown).

Also seen in FIG. 4, is the fact that the gripping of the rolls R by the grippers 23 is about on the pitch line of the chain sprockets 50. This decreases the required gap between the rolls in the flow as the rolls are rotated out of the path of flow on the takeaway conveyor.

Referring again to the right hand portion of FIG. 4, the numerals 51 and 52 designate cams or, more precisely, camming surfaces suitably mounted on the frame of the machine. Inasmuch as three diverter conveyors are employed in the illustration given, I employ three camming surfaces, one not shown in FIG. 4 but being located behind the cam 52. For example, the cam 52 is arranged to engage the cam follower 53 which is positioned on the near side of the carrier 19A. The next carrier downstream designated 19B in the central portion of FIG. 4 has its cam follower 54 located on the far side — as can be appreciated that it is partially hidden by the rolls supported by the carrier 19B. This cam follower 54 is actuated by the camming surface hidden behind the camming surface 52. The next downstream carrier 19C is equipped with a cam follower 55 (also on the near side as viewed in FIG. 4) but positioned above the cam followers 53 and 54 so as to be in alignment with the camming surface 51.

Inasmuch as the grippers 26 associated with the takeaway conveyor 11 are spring closed, i.e., cam opened, the cams 51, 52, etc. serve to sequentially open the grippers associated with the cam followers 55, 54, and 53 so as to permit them to straddle a given roll R and grip the same after disengagement with their respective camming surfaces. The camming surfaces are shown partially shaded in FIG. 4 to designate inclines or ramps on the camming so as to permit a gentle start and stop of movement of the various slide members 37. Thus, the cam opening and closing of the grippers 19 occurs over approximately 90° — the length of the camming surfaces 51 and 52 relative to the path of chain 21 — with the closing being achieved when a carrier is in the position designated 19D.

Since each roll R being advanced by the source conveyor 10 is intended to be gripped (except it be misshapened, undersized, etc.), each gripper 26 is opened and closed by the camming surfaces 51, 52, etc. It will be immediately appreciated that if more or less diversionary paths are required, the same can be readily effected by changing the number and position of the cam followers 53, 54, 55, etc. In this connection, reference is made to FIG. 2 wherein the cam followers 53 and 55 are seen on the right hand side of the view while the cam 54 is seen on the left hand side. Shown in dotted line and designated by the numeral 56 is the position of a fourth cam followers should the apparatus be set up with four diversionary paths.

The camming surfaces shown in FIG. 2 are those associated with the area of potential transfer of rolls from the takeaway conveyor 11 to the first diverter conveyor 16. Thus, the camming surface 57 (see the upper right hand portion of FIG. 2) is associated with the cam follower 55 and this is also designated in the central portion of FIG. 4. The camming surface 58 (still referring to FIG. 4) is that aligned for engagement with the cam follower 53. As was the case with the camming surface hidden behind that designated 52 associated with the horizontal run 14, the camming surface for the remote side cam follower 54 in the inclined run 15 is hidden behind the camming surface 58. However, that camming surface can be seen in FIG. 2 and is designated 59 in the left hand portion thereof.

Reference to FIG. 5 reveals a typical arrangement for positioning camming surfaces such as those designated 58 and 59. Referring to the right hand side of FIG. 5, it will be seen that a cylinder and piston rod unit 60 is interposed between the frame 25 and a cross bar 61. The cross bar 61 carries arms 62 and 63 which are mounted in slides 64 and 65 respectively. The inner projections of the arms 62 and 63 are secured to the camming surface 58. Thus, upon energization (or deenergization) of the cylinder and piston rod 60 — as by fluid pressure, the camming surface 58 is positioned to engage or not engage its associated cam follower 53, as the case may be.

In the illustration given in FIG. 4, only the camming surface 57 (that associated with the cam followers 55) is in the "engagement" position so that every third roll is released for pickup by the first diverter conveyor 16.

Inasmuch as the diverter conveyor grippers 27 are cam-closed — as contrasted to the cam-opened grippers 26 associated with the takeaway conveyor 11 — a correspondingly longer camming surface is required to insure that the rolls R are gripped as they travel along the horizontal length of the first diverter conveyor 16. For example, the gripper 27 in the 27' position (see the extreme left hand portion of FIG. 4) still must have its cam follower 66 urged inwardly by contact with its associated camming surface 67.

In order to permit maximum flexibility to the system, i.e., direct rolls from one diverter conveyor to another, I provide a second cam 68 in association with the cam 66 (see also the right hand portion of FIG. 2). This cam follower 68 is actuatable by the camming surface 69. Thus, when a roll is being gripped by the gripper 27' — and it is desired to direct the third next-in-line roll to another diverter conveyor, it is possible to deactivate the camming surface 69 while maintaining the camming surface 67 in activated condition. This permits retention of the roll R by the gripper 27' in its gripped condition while not gripping the third next-in-line roll.

The remainder of the cam follower and camming surface arrangement is analogous to that described relative to the takeaway conveyor 11. In other words, there is a lower near cam follower means and camming surface means and a far or remote cam follower means and camming surface means shown but not designated in FIG. 2. Additionally, there is a provision for the fourth diverter path should such be desired.

In essence, there are the same number of cam paths as there are diverter paths. At the source conveyor 10 the three fixed cams 51, 52, etc. cause all of the grippers 26 to pick up rolls R. At the last diverter conveyor 18, all of the cams are also fixed in both the diverter section and the takeaway conveyor to cause all of the rolls left in the system to be diverted. The diverter positions other than the last have three movable cams in the diverter section and three movable cams in the takeaway conveyor. The operation of the matching upper and lower cams causes the rolls controlled by this cam path to be diverted. The operation of the movable cams is timed to the location of the roll carriers. This allows the operator or a signal from the downstream equipment to change the flow of rolls at full speed of the equipment.

The apparatus described herein not only permits adjustment of the flow (at high speed) of a stream of rolls into various diversionary paths, but also achieves this while the rolls are under careful control. The various upstanding and depending fingers are structured and arranged so as to grip a roll along its horizontal center line, and further, the diverter gripper fingers are constructed and arranged to grip a roll at about the pitch level of the diverter conveyor itself.

I claim:

1. Apparatus for handling wound rolls comprising
    a source conveyor adapted to deliver a series of individual wound rolls along a first path,
    an endless takeaway conveyor arranged with a portion of its lower run traveling along a path at an upwardly inclined angle to said first conveyor path and equipped with spaced apart depending grippers adapted to grip each roll delivered by said source conveyor, and
    a plurality of endless diverter conveyors located at spaced distances along said inclined path, with each diverter conveyor having its upper run disposed parallel to said first conveyor path,
    each diverter conveyor being equipped with spaced apart upstanding grippers, and
    means associated with each diverter conveyor and said takeaway conveyor for selectively operating the grippers thereof whereby a selected roll from said takeaway conveyor can be selectively diverted into any of said diverter conveyors and each succeeding roll selectively diverted into any of said diverter conveyors.

2. The structure of claim 1 in which said source conveyor terminates a spaced distance from the first of said diverter conveyors in said path whereby a rejection zone is provided for rolls ungripped by said takeaway conveyor.

3. The structure of claim 1 in which each takeaway conveyor gripper includes spring closed, cam-opened opposed fingers, said takeaway conveyor being operated at a linear speed faster than said source conveyor.

4. The structure of claim 3 in which the grippers associated with each diverter conveyor are cam-opened, springclosed.

5. Apparatus for handling rolls of wound web material comprising a frame,
    a source conveyor mounted on said frame and adapted to deliver a series of said rolls along a first horizontal path,
    an endless takeaway conveyor mounted on said frame and having upper and lower runs, and being equipped with a plurality of spaced apart depending roll grippers, a portion of said lower run being generally horizontal and disposed above said source conveyor whereby said grippers are adapted to grip rolls being delivered by said source conveyor,
    each of said grippers including three fingers grouped two on one side of a gripped roll and one finger on the other, means operably associated with said grippers for selectively closing the fingers thereof into roll gripping position,
    said takeaway conveyor having a second position of its lower run disposed at an upwardly inclined angle with said source conveyor terminating a spaced distance from said second run portion to provide a receiving area for reject rolls ungripped by said takeaway conveyor,
    a plurality of endless diverter conveyors mounted on said frame each having upper and lower runs with the upper runs being generally horizontal and being located at spaced distances along said takeaway conveyor second portion to selectively receive rolls therefrom, each diverter conveyor being equipped with a plurality of spaced apart upstanding grippers, each of said diverter grippers including three fingers grouped two on one side of roll and one finger on the other but arranged opposite to said takeaway conveyor gripper fingers so as to interlace therewith.

6. The structure of claim 5 in which drive means are operably associated with said takeaway conveyor for operating said takeaway conveyor at a faster linear speed than said source conveyor to develop a spacing between adjacent rolls.

7. Apparatus for handling wound rolls comprising
a source conveyor adapted to deliver a series of wound rolls along a first path,
an endless takeaway conveyor arranged with a portion of its lower run traveling along a path at an upwardly inclined angle to said first conveyor path and equipped with spaced apart depending grippers adapted to grip each roll delivered by said source conveyor, and
a plurality of endless diverter conveyors located at spaced distances along said inclined path, with each diverter conveyor having its upper run disposed parallel to said first conveyor path,
each diverter conveyor being equipped with spaced apart upstanding grippers, and
means associated with each diverter conveyor and said takeaway conveyor for selectively operating the grippers thereof whereby selected rolls from said takeaway conveyor can be selectively diverted into any of said diverter conveyors, each gripper including opposed fingers, said gripper being equipped with cam follower means for varying the finger spacing, and cam means constituting said gripper operating means, each gripper including three fingers grouped two on one side of the roll path associated therewith and one gripper on the other, the grouping of the grippers on said takeaway conveyor being opposite to the grouping of said grippers on said diverter conveyors.

8. The structure of claim 7 in which said diverter gripper fingers are constructed and arranged to grip a roll at about the level of said diverter conveyors.

9. Apparatus for handling rolls of wound web material comprising a frame,
a source conveyor mounted on said frame and adapted to deliver a series of said rolls along a first horizontal path,
an endless takeaway conveyor mounted on said frame and having upper and lower runs, and being equipped with a plurality of spaced apart depending roll grippers, said lower run having a generally horizontal portion and disposed above said source conveyor whereby said grippers are adapted to grip rolls being delivered by said source conveyor,
each of said grippers including three fingers grouped two on one side of a gripped roll and one finger on the other, means operably associated with said grippers for selectively closing the fingers thereof into roll gripping position,
said takeaway conveyor extending said source conveyor to provide a receiving area for reject rolls ungripped by said takeaway conveyor.

10. Apparatus for handling wound rolls comprising
a source conveyor adapted to deliver a series of wound rolls along a first path,
an endless takeaway conveyor arranged with a portion of its lower run traveling along a path at an upwardly inclined angle to said first conveyor path and equipped with spaced apart depending grippers adapted to grip each roll delivered by said source conveyor, and
a plurality of endless diverter conveyors located at spaced distances along said inclined path, with each diverter conveyor having its upper run disposed parallel to said first conveyor path,
each diverter conveyor being equipped with spaced apart upstanding grippers, and
means associated with each diverter conveyor and said takeaway conveyor for selectively operating the grippers thereof whereby selected rolls from said takeaway conveyor can be selectively diverted into any of said diverter conveyors, each gripper including opposed fingers, said gripper being equipped with cam follower means for varying the finger spacing, and cam means constituting said gripper operating means, fluid power means are operably associated with each cam means for selectively positioning the same.

* * * * *

UNITED STATES PATENT OFFICE
CERTIFICATE OF CORRECTION

Patent No. 4,033,862                    Dated  July 5, 1977

Inventor(s)  Harvey J. Spencer

It is certified that error appears in the above-identified patent and that said Letters Patent are hereby corrected as shown below:

Column 8, line 18, after "extending" insert -- beyond --.

Signed and Sealed this

Twenty-first Day of March 1978

[SEAL]

*Attest:*

RUTH C. MASON  
*Attesting Officer*

LUTRELLE F. PARKER  
*Acting Commissioner of Patents and Trademarks*